US012746975B2

(12) United States Patent
Katsuyama

(10) Patent No.: US 12,746,975 B2
(45) Date of Patent: Sep. 29, 2026

(54) VEHICLE BODY FRONT STRUCTURE

(71) Applicant: SUBARU CORPORATION, Tokyo (JP)

(72) Inventor: Hiroyuki Katsuyama, Tokyo (JP)

(73) Assignee: Subaru Corporation, Tokyo (JP)

( * ) Notice: Subject to any disclaimer, the term of this patent is extended or adjusted under 35 U.S.C. 154(b) by 351 days.

(21) Appl. No.: 18/435,569

(22) Filed: Feb. 7, 2024

(65) Prior Publication Data

US 2024/0300586 A1 Sep. 12, 2024

(30) Foreign Application Priority Data

Mar. 7, 2023 (JP) ................................ 2023-034924

(51) Int. Cl.
*B62D 25/08* (2006.01)
*B62D 29/00* (2006.01)

(52) U.S. Cl.
CPC ......... *B62D 25/085* (2013.01); *B62D 29/008* (2013.01)

(58) Field of Classification Search
CPC ............................ B62D 25/085; B62D 29/008
See application file for complete search history.

(56) References Cited

U.S. PATENT DOCUMENTS

2004/0140693 A1* 7/2004 Gibbianelli .......... B62D 25/025 296/203.01
2012/0205944 A1* 8/2012 Kido .................... B62D 25/088 296/187.09
2015/0130223 A1* 5/2015 Amemiya ............ B62D 25/088 296/193.09
2015/0166117 A1* 6/2015 Ohoka ................. B62D 25/082 219/91.22
2016/0244103 A1 8/2016 Amemiya
2018/0170434 A1* 6/2018 Saito .................... B62D 25/145
2018/0273095 A1* 9/2018 Chinzei ................ B62D 29/008
2019/0039652 A1* 2/2019 Kamei ................... B62D 21/03
2023/0264757 A1* 8/2023 Nishimura ........... B62D 25/085 296/203.02
2024/0208583 A1* 6/2024 Maeda ................. B62D 25/082
2025/0128764 A1* 4/2025 Ishihara ............. B62D 25/2018
2025/0162654 A1* 5/2025 Yoshimoto ........... B62D 21/152
2025/0178673 A1* 6/2025 Sekiguchi ............ B62D 29/008

FOREIGN PATENT DOCUMENTS

JP 2015-85801 A 5/2015

* cited by examiner

*Primary Examiner* — Taras P Bemko
(74) *Attorney, Agent, or Firm* — McGinn IP Law Group, PLLC

(57) ABSTRACT

A vehicle-body front structure for a vehicle includes front side frames in a pair and suspension towers in a pair. The side frames are arranged in a vehicle width direction of the vehicle and extend in a vehicle body longitudinal direction of the vehicle. The suspension towers support upper portions of suspension devices and are disposed outside the front side frames in the vehicle width direction. Joint flanges are provided respectively in the front side frames and are inclined while extending to an upper outer side in the vehicle width direction respectively toward the suspension towers. Positioning flanges are provided in a lower end portion of the suspension towers respectively. Each of the positioning flanges is selectively fixed to a fixation position of two or more different fixation positions set in a corresponding one of the joint flanges.

19 Claims, 7 Drawing Sheets

VEHICLE BODY FRONT STRUCTURE

CROSS-REFERENCE TO RELATED APPLICATIONS

The present application claims priority from Japanese Patent Application No. 2023-034924 filed on Mar. 7, 2023, the entire contents of which are hereby incorporated by reference.

BACKGROUND

The disclosure relates to a vehicle body front structure including a suspension tower that supports a suspension device and the vicinity of the suspension tower.

In the engine room in a front portion of a vehicle body, a pair of left and right front side frames extending from the bottom of a toeboard toward the front of the vehicle body have conventionally been provided. Upper side frames extending from a cowl top toward the front of the vehicle body along both sides of the engine room are provided outside the front side frames in the vehicle width direction.

Suspension towers that support the upper portions of damper mechanisms of the suspension devices are provided between the front side frames and the upper side frames.

The suspension towers are fixed to the front side frames and the upper side frames.

Conventionally, various techniques regarding the structure for fixing the suspension towers to the front side frames have been proposed. For example, Japanese Unexamined Patent Application Publication (JP-A) No. 2015-85801 discloses a vehicle body front structure that fixes the suspension towers to the front side members (front side frames) by integral molding of front side member components and the suspension towers.

SUMMARY

An aspect of the disclosure provides a vehicle body front structure for a vehicle. The vehicle-body front structure includes front side frames in a pair and suspension towers in a pair. The side frames are arranged in a vehicle width direction of the vehicle and extend in a vehicle body longitudinal direction of the vehicle. The suspension towers support upper portions of suspension devices and are disposed outside the front side frames in the vehicle width direction. Joint flanges are provided respectively in the front side frames and are inclined while extending to an upper outer side in the vehicle width direction respectively toward the suspension towers. Positioning flanges are provided in a lower end portion of the suspension towers respectively. Each of the positioning flanges is selectively fixed to a fixation position of two or more different fixation positions set in a corresponding one of the joint flanges.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

When integral molding of suspension towers and parts of front side frames is performed as in the structure disclosed in JP-A-2015-85801, the positions of the suspension towers with respect to the front side frames are fixed at predetermined positions. In the structure as described above, the front side frames and the suspension towers are not shared among various vehicle models in which, for example, the mounting position of the suspension device of the vehicle is not the same. Accordingly, in the technique in JP-A-2015-85801, dedicated front side frames and dedicated suspension towers are necessary at least for each vehicle model in which the positional relationship between the mounting portions of the suspension devices and the front side frames is the same.

It is desirable to provide a vehicle body front structure in which the front side frames and the suspension towers can be shared among multiple types of vehicles in which the mounting position of the suspension device is not the same.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The vehicle body front structure of a front engine vehicle will be described as an example of the vehicle body front structure according to the embodiment. It is noted that the word “joint” in the following description indicates a joint method represented by, for example, fusion joint or mechanical joint.

Figure 1:
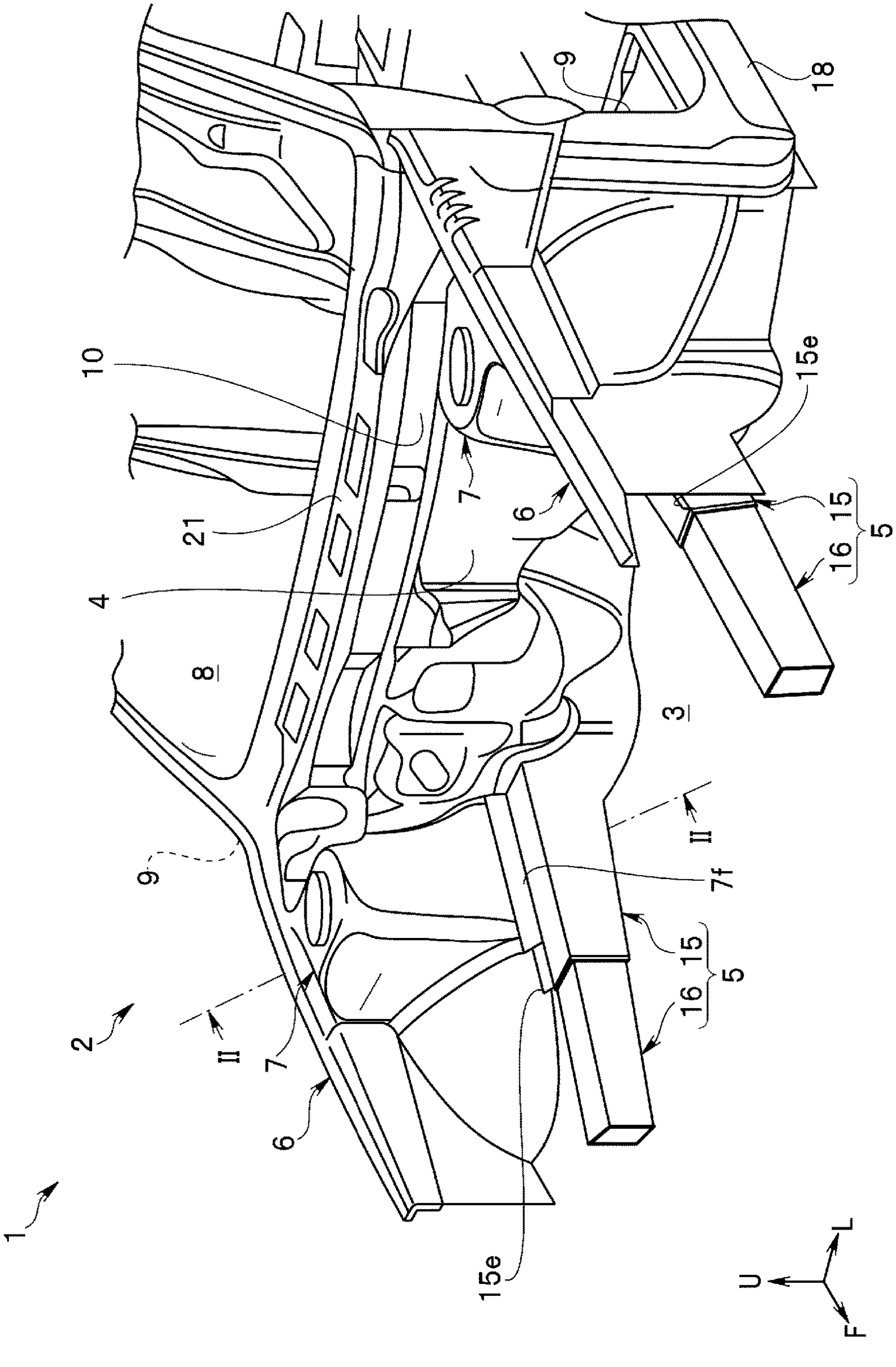
FIG. 1 is a perspective view illustrating the frame structure of a vehicle body front portion.

As illustrated in FIG. 1, a vehicle body 2 of a vehicle 1 has an engine room 3 in the front portion.

The engine room 3 includes a toeboard 4, a pair of front side frames 5, a pair of upper side frames 6, and a pair of suspension towers 7.

The toeboard 4 extends in the vehicle width direction as a separating wall that separates a cabin 8 from the engine room 3. Both end portions of the toeboard 4 in the vehicle width direction are joined to a pair of left and right front pillars 9 that constitute the vehicle body 2. In addition, the upper end portion of the toeboard 4 is joined to a bulkhead 10 extending in the vehicle width direction along the toeboard 4.

The pair of front side frames 5 extend toward the front of the vehicle body 2 from the lower side of the toeboard 4 outside a middle portion in the vehicle width direction of the toeboard 4.

Each of the front side frames 5 is formed by coupling multiple frame members.

In detail, the front side frame 5 includes, for example, a front side frame body 15 and an extension frame 16.

It is noted that the basic structures of the portions outside the front side frames 5 in the vehicle width direction are symmetric with each other. Accordingly, in the following, the right side portion of the vehicle body will be described as an example.

Figure 2:
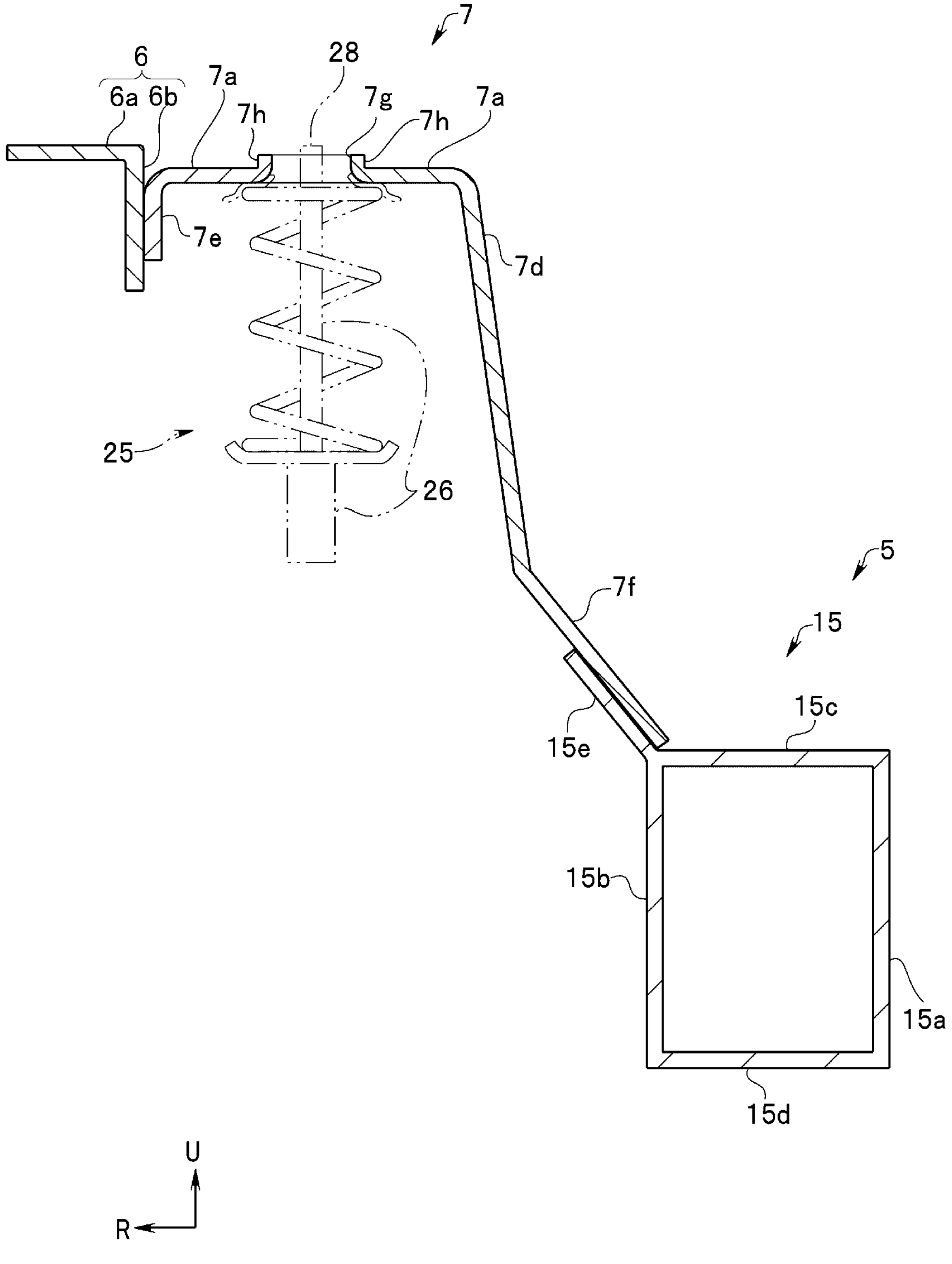
FIG. 2 is a cross-sectional view taken along line II-II in FIG. 1.

As illustrated in FIG. 2, the front side frame body 15 includes a pair of side wall portions 15*a* and 15*b*, an upper wall portion 15*c*, a bottom wall portion 15*d*, and a joint flange 15*e*.

The pair of side wall portions 15*a* and 15*b* face each other with a predetermined interval therebetween in the vehicle width direction.

The upper wall portion 15*c* and the bottom wall portion 15*d* face each other with a predetermined interval therebetween in the vertical direction. The upper wall portion 15*c* and the bottom wall portion 15*d* couple the upper end portions of the side wall portion 15*a* and the side wall portion 15*b* to each other and the lower end portions of the side wall portion 15*a* and the side wall portion 15*b* to each other, respectively.

As a result, the pair of side wall portions 15*a* and 15*b*, the upper wall portion 15*c*, and the bottom wall portion 15*d* form a rectangular closed cross-section.

The joint flange 15*e* extends to the upper outer side in the vehicle width direction so as to be inclined from, for example, the coupling portion between the upper wall portion 15*c* and the side wall portion 15*b*.

Figure 3:
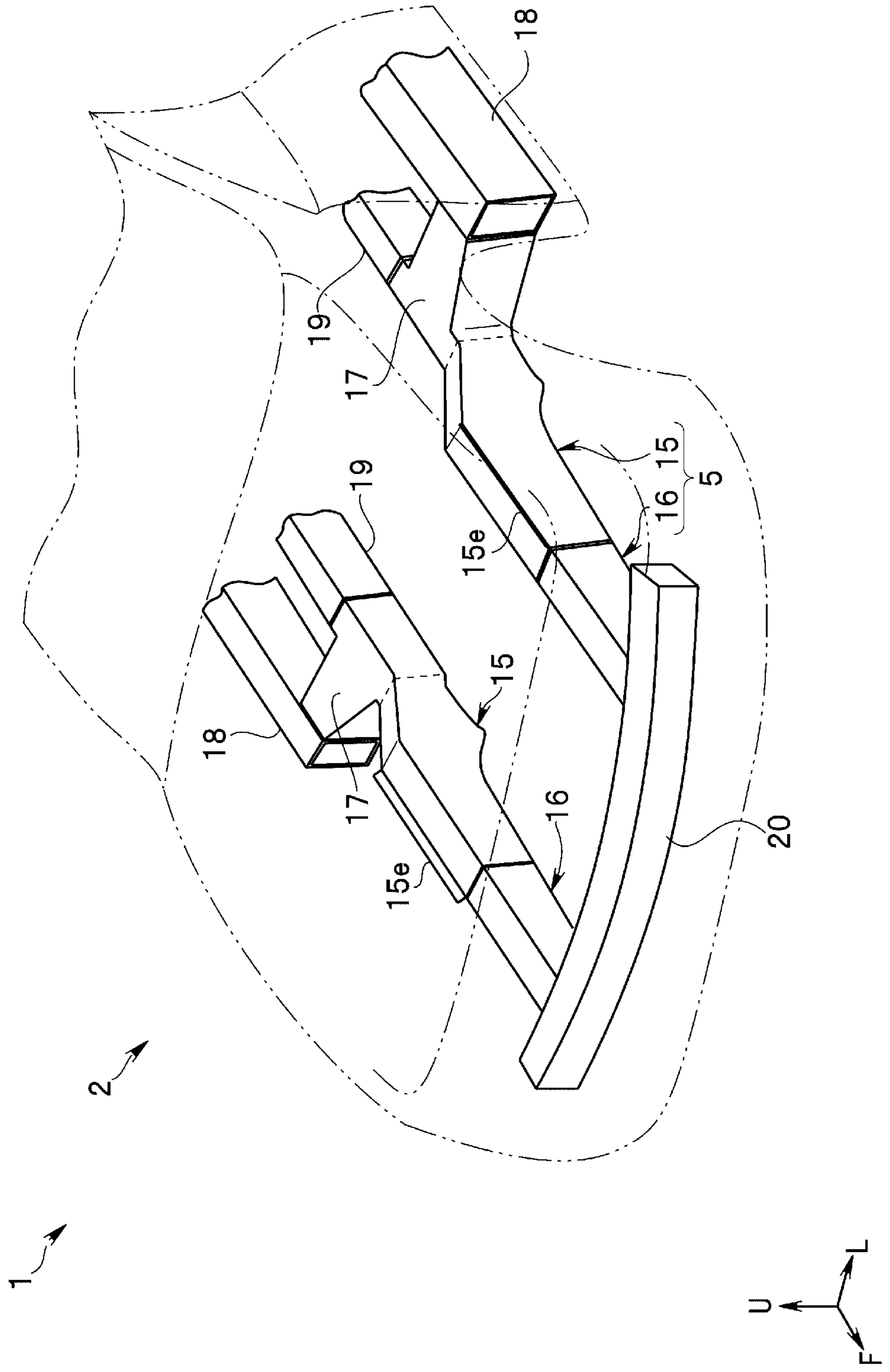
FIG. 3 is a perspective view illustrating the structure of front side frames.

As illustrated in FIG. 3, torque boxes 17 are provided at the rear ends of the front side frame bodies 15.

Here, in the present embodiment, integral molding of the front side frame body 15 and the torque box 17 is performed by aluminum die casting. The torque box 17 has, for example, a rectangular closed cross-section. The rear end portion of the front side frame body 15 is joined to the front end portion of a side sill 18 and the front end portion of a floor side frame 19 via the torque box 17. It is noted that the front side frame body 15 and the torque box 17 may be, for example, molded separately and coupled to each other instead of being molded as in this example.

The extension frame 16 has, for example, a rectangular closed cross-section. The extension frame 16 is formed by, for example, aluminum extrusion molding. The extension frame 16 extends from the front side frame body 15 to the front portion of the vehicle body 2 when the extension frame 16 is joined to the front end portion of the front side frame body 15. In addition, the front end portion of the extension frame 16 is joined to a bumper beam 20 that extends while being bent toward the front along the vehicle width direction as illustrated in FIG. 3.

Here, the length of the extension frame 16 depends on, for example, the vehicle model. The extension frame 16 can be selectively joined to the front side frame body 15 depending on the vehicle model.

Due to these structures, the front side frame 5, which extends in the vehicle body longitudinal direction, serves as an energy absorbent member that absorbs collision energy during collision of the front portion of the vehicle and distributes the energy to the side sill 18 and floor side frame 19 via the torque box 17.

As illustrated in FIG. 1, the pair of upper side frames 6 are disposed on both sides of the engine room 3 in the vehicle width direction. The upper side frame 6 extends from a cowl top 21 to the front of the vehicle body along the engine room 3.

As illustrated in FIG. 2, the upper side frame 6 has, for example, an L-shaped cross-section. The upper side frame 6 has a top plate portion 6*a* and a side wall portion 6*b*.

The top plate portion 6*a* is disposed at a position facing an engine hood (not illustrated) that blocks the opening of the engine room 3.

The side wall portion 6*b* extends downward from an end portion of the top plate portion 6*a* on the inner side in the vehicle width direction.

Integral molding of the pair of suspension towers 7 is performed by aluminum die casting. The suspension tower 7 is provided between the front side frame 5 and the upper side frame 6.

Figure 4:
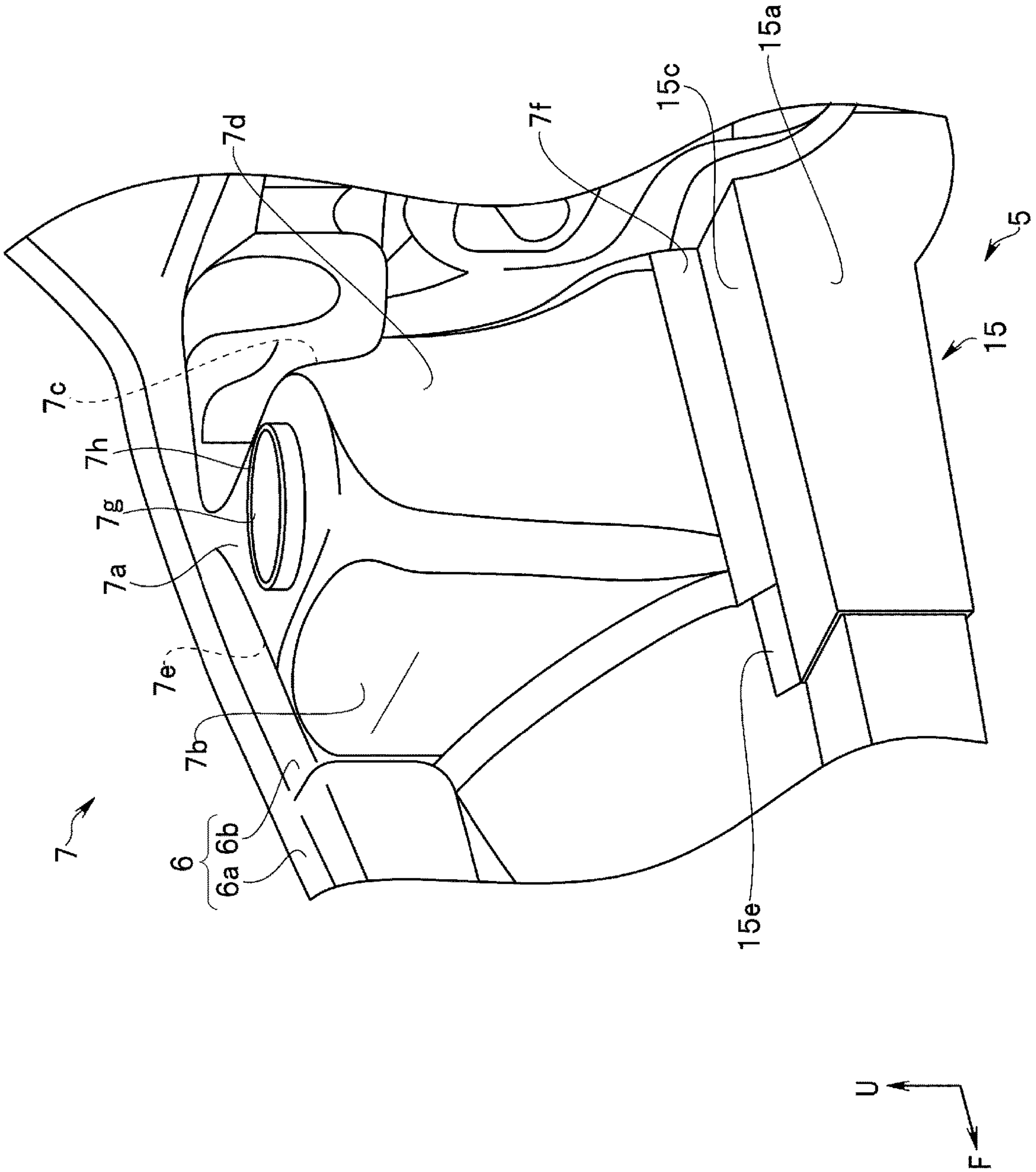
FIG. 4 is an enlarged view of a suspension tower.

As illustrated in FIGS. 2 and 4, the suspension tower 7 includes a top plate portion 7*a*, vertical wall portions 7*b*, 7*c*, and 7*d*, and positioning flanges 7*e* and 7*f*.

The top plate portion 7*a* is provided at a position facing the engine hood. The top plate portion 7*a* has a substantially rectangular shape in plan view.

A suspension mounting hole 7*g* is formed approximately in the center of the top plate portion 7*a*. In more detail, the suspension mounting hole 7*g* is formed of a substantially circular standing portion 7*h* that stands upward from the top plate portion 7*a*.

As illustrated in FIG. 2, an upper end portion 28 of a shock absorber 26 of a suspension device 25 can be inserted into the suspension mounting hole 7*g* from below the suspension mounting hole 7*g*. As a result, the upper portion of the suspension device 25 is supported by the suspension tower 7.

The vertical wall portions 7*b*, 7*c*, and 7*d* extend downward from the front and rear edge portions of the top plate portion 7*a* in the vehicle body longitudinal direction and the inner edge portion of the top plate portion 7*a* in the vehicle width direction.

The positioning flange 7*e* is provided in the outer edge portion of the top plate portion 7*a* in the vehicle width direction.

The positioning flange 7*f* extends, for example, from the lower end portion of the vertical wall portion 7*d* so as to be inclined to the lower inner side in the vehicle width direction. The positioning flange 7*f* can make contact with the joint flange 15*e* of the front side frame body 15 from above. In this state, the positioning flange 7*f* can be joined to the joint flange 15*e*.

Here, the area of the contact surface between the joint flange 15*e* and the positioning flange 7*f* is set larger than the joint area necessary to join the joint flange 15*e* and the positioning flange 7*f* to each other at a predetermined joint strength.

Figure 5:
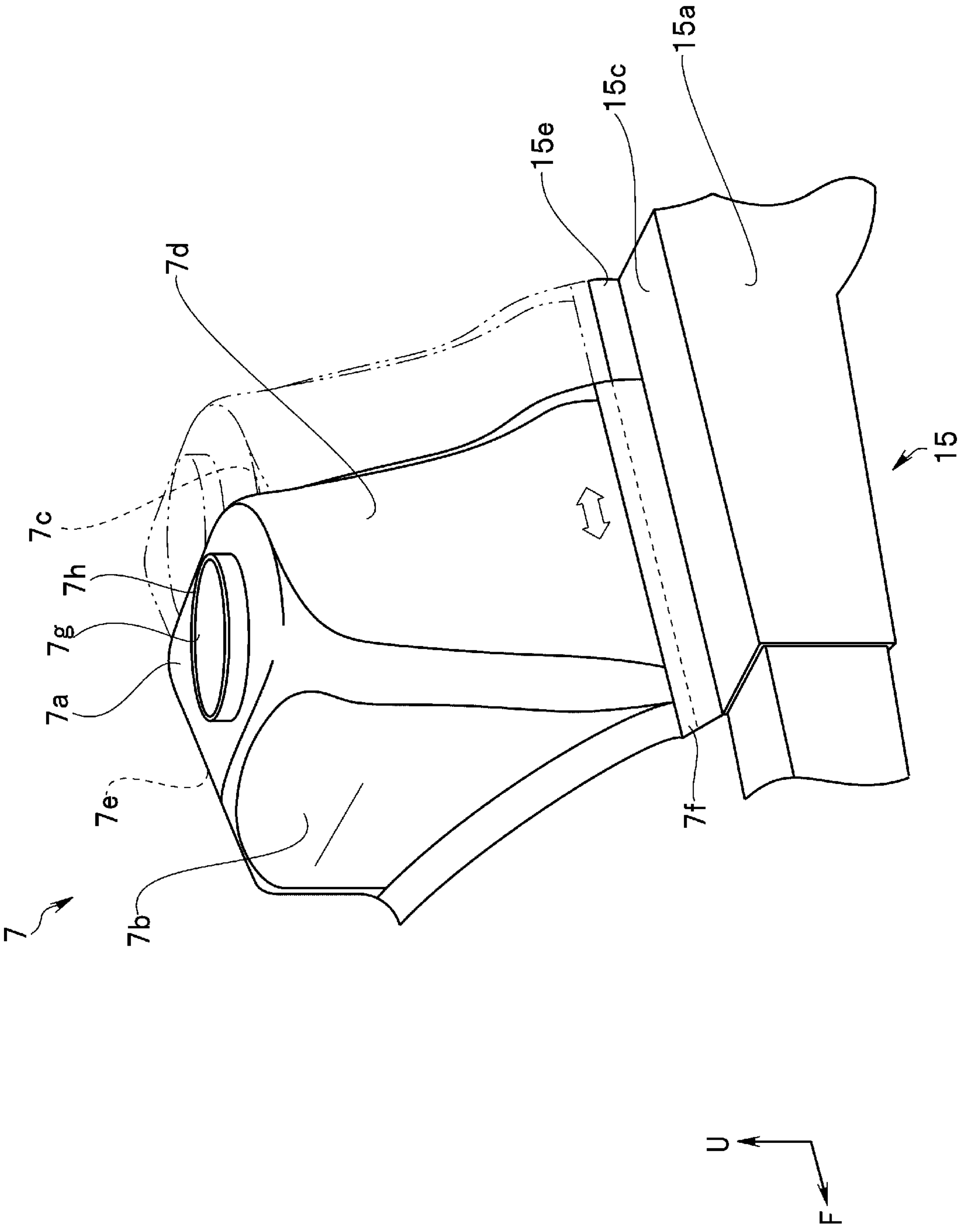
FIG. 5 is a diagram for describing the state in which the fixation position of the suspension tower has been displaced in a vehicle body longitudinal direction.

In detail, as illustrated in FIG. 4, for example, the length of the joint flange 15*e* in the longitudinal direction is set longer than the length of the positioning flange 7*f* in the longitudinal direction. As a result, as illustrated in FIG. 5, the joint flange 15*e* can be joined to the positioning flange 7*f* without reduction in the joint strength even when the suspension tower 7 is displaced in the longitudinal direction of the vehicle body.

Figure 6:
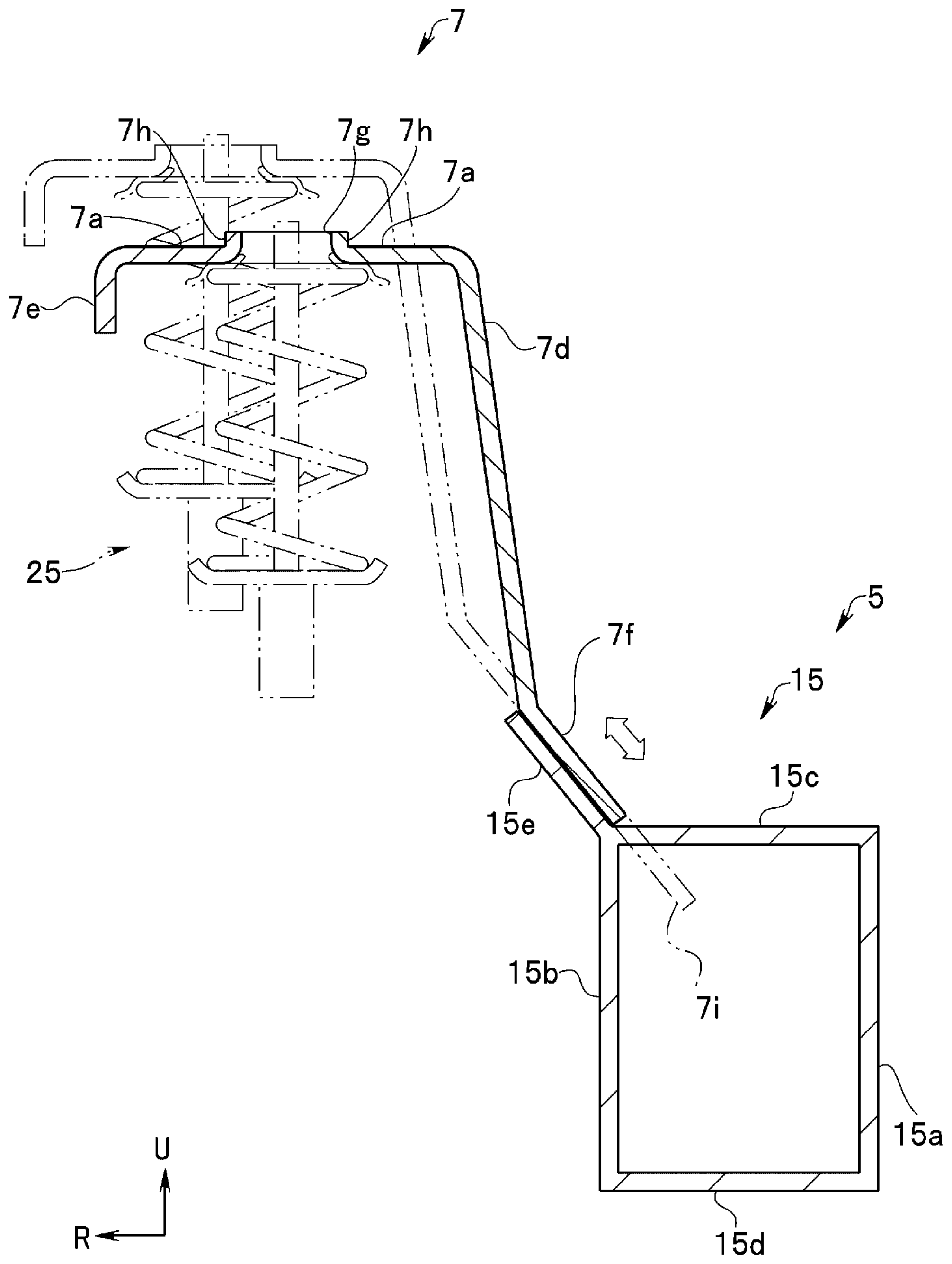
FIG. 6 is a diagram for describing the state in which the fixation position of the suspension tower has been displaced in the vehicle width direction and the vehicle body vertical direction.

In addition, as illustrated in FIG. 2, for example, the length of the positioning flange 7*f* in the extending direction is set longer than the length of the joint flange 15*e* in the extending direction. As illustrated in FIG. 6, the length of the positioning flange 7*f* in the extending direction can be changed by cutting an extending end portion 7*i* of the positioning flange 7*f*. As a result, the positioning flange 7*f* can be joined to the joint flange 15*e* without reduction in the joint strength even when the suspension tower 7 is displaced in the vertical direction and the vehicle width direction.

As a result, the positioning flange 7*f* of the suspension tower 7 is configured such that the fixation position where the positioning flange 7*f* is fixed to the joint flange 15*e* is adjustable in the three axial directions of the vehicle body 2. In one example, the three axial directions of the vehicle body 2 include a vehicle body longitudinal direction, a vehicle width direction, and a vehicle body vertical direction.

The suspension tower 7 configured as described above can be shared among multiple types of vehicles 1 in which, for example, the mounting position of the suspension device 25 is not the same.

When the suspension tower 7 is joined, the positioning flange 7*f* of the suspension tower 7 is in contact with the joint flange 15*e* of the front side frame body 15. The positioning flange 7*f* at this time is fixed to the joint flange 15*e* at a fixation position that depends on the vehicle model. Fixation positions depending on vehicle models may be different from each other.

That is, the positioning flange 7*f* of the suspension tower 7 can be fixed to a fixation position that is selected according to the vehicle model from two or more different fixation positions set in the joint flange 15*e*.

As a result, the positioning flange 7*e* of the suspension tower 7 is in contact with the side wall portion 6*b* of the upper side frame 6. In addition, the positioning flange 7*e* is joined to the side wall portion 6*b* (see FIG. 2).

In addition, the extension frame 16 having a specification that depends on the vehicle model is selectively joined to the front end portion of the front side frame body 15.

Accordingly, the front side frame body 15 and the suspension tower 7 can be shared among multiple types of vehicles 1 in which the mounting position of the suspension device 25 is not the same.

According to the embodiment as described above, a vehicle body front structure includes a pair of front side frames 5 and a pair of suspension towers 7. The pair of front side frames 5 are arranged in a vehicle width direction and extend in a vehicle body longitudinal direction. The pair of suspension towers 7 support upper portions of suspension devices 25 and are disposed outside the pair of front side frames 5 in the vehicle width direction. A joint flange 15*e* is provided in each of the front side frames 5 and is inclined while extending to an upper outer side in the vehicle width direction toward each of the suspension towers 7. A positioning flange 7*f* is provided in a lower end portion of each of the suspension towers 7. Each positioning flange 7*f* is configured to be selectively fixed to a fixation position of two or more different fixation positions set in a respective one of the joint flanges 15*e*. Due to these structures, in the vehicle body front structure, the front side frame and the suspension tower can be shared among multiple types of vehicles 1 in which the mounting position of the suspension device 25 is not the same.

That is, the vehicle body front structure has the joint flange 15*e* inclined to the upper outer side in the vehicle width direction with respect to the front side frame 5. In addition, the vehicle body front structure has the positioning flange 7*f* in the lower end portion of the suspension tower 7. In addition, the positioning flange 7*f* can be selectively fixed to a fixation position of the two or more different fixation positions set in the joint flange 15*e*.

Due to the operations of the positioning flange 7*f* and the joint flange 15*e*, the vehicle body front structure according to the present embodiment can adjust the fixation position of the suspension tower 7 with respect to the front side frame 5 in three axial directions. As a result, the suspension tower 7 can be selectively fixed to the front side frame 5 of multiple types of vehicles 1 in which the mounting position of the suspension device 25 is not the same.

In addition, the front side frame 5 includes the front side frame body 15 and the extension frame 16. The extension frame 16 having a length that depends on the vehicle model is joined to the front end portion of the front side frame body 15. As a result, even when the front side frame body 15 is shared, the length of the front side frame 5 that depends on the vehicle model can be obtained.

Due to these structures, the front side frame body 15 of the front side frame 5 can be shared among multiple types of vehicles 1 in which the mounting position of the suspension device 25 is not the same.

Furthermore, the front side frame body 15 and the suspension tower 7 are molded by aluminum die casting. Accordingly, in the vehicle body front structure, the weight of the vehicle 1 can be reduced and the manufacturing cost can be reduced.

In addition, the displaceable area of the suspension tower 7 with respect to the front side frame 5 can be adjusted by changing the extension lengths, the extension directions, the length in the vehicle body longitudinal direction of the positioning flange 7*f* and the joint flange 15*e*, and the like. This can further share the front side frame and the suspension tower among multiple types of vehicles 1 in which the mounting position of the suspension device 25 is not the same.

It is noted that an example in which the joint flange 15*e* extends from the coupling portion between the upper wall portion 15*c* and the side wall portion 15*b* has been described, but the joint flange 15*e* may extend from the coupling portion between the upper wall portion 15*c* and the side wall portion 15*a*.

Figure 7:
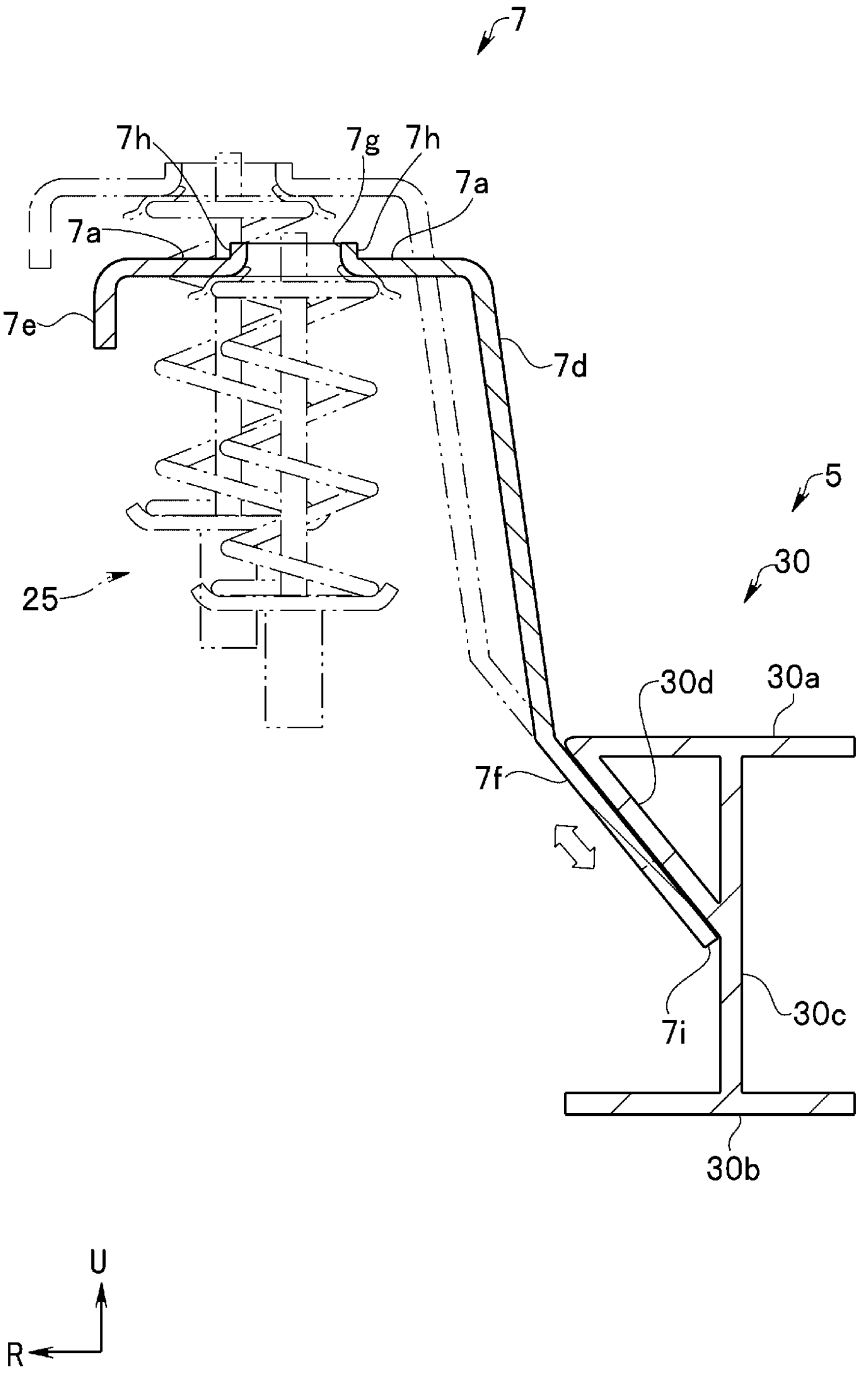
FIG. 7 is a cross-sectional view illustrating a suspension tower and a front side frame according to a modified example.

FIG. 7 illustrates the front side frame body 15 of the front side frame 5 according to a modified example.

As illustrated in FIG. 7, a front side frame body 30 includes an upper wall portion 30*a*, a bottom wall portion 30*b*, a vertical wall portion 30*c*, and a joint flange 30*d*. It is noted that the components similar to those in the embodiment described above will not be described.

The upper wall portion 30*a* and the bottom wall portion 30*b* face each other with a predetermined interval therebetween in the vertical direction.

The vertical wall portion 30*c* extends downward from a midstream point on the upper wall portion 30*a* in the vehicle width direction. The lower end portion of the extending vertical wall portion 30*c* is coupled to a midstream point on the bottom wall portion 30*b* in the vehicle width direction.

As a result, the upper wall portion 30*a*, the bottom wall portion 30*b*, and the vertical wall portion 30*c* form an open cross-section with an H-shape.

The joint flange 30*d* extends diagonally to, for example, an upper outer side in the vehicle width direction from a midstream point on the vertical wall portion 30*c* in the vehicle body vertical direction. The end portion of the extending joint flange 30*d* is coupled to the end portion of the upper wall portion 30*a* on the outer side in the vehicle width direction.

Due to the structure as described above, the joint flange 30*d* of the front side frame body 30 can extend longer while ensuring the strength.

This front side frame body 30 is formed by, for example, aluminum extrusion molding. It is noted that the torque box 17 molded by, for example, aluminum die casting can be joined to the rear of the front side frame body 30 via a bracket or the like. Furthermore, the extension frame 16 formed by, for example, aluminum extrusion molding or the like can be joined to the front end portion of the front side frame body 30 via a bracket or the like.

Here, the area of the contact surface between the joint flange 30*d* and the positioning flange 7*f* is set larger than the joint area necessary to join the joint flange 30*d* and the positioning flange 7*f* to each other at a predetermined joint strength.

In detail, for example, the length of the joint flange 30*d* in the longitudinal direction is set longer than the length of the positioning flange 7*f* in the longitudinal direction. As a result, the joint flange 30*d* can be joined to the positioning flange 7*f* without reduction in the joint strength even when the suspension tower 7 is displaced in the longitudinal direction of the vehicle body.

In addition, as illustrated in FIG. 7, the length of the joint flange 30*d* extending diagonally upward is set to substantially the same as, for example, the length of the positioning flange 7*f* in the extending direction. As a result, the positioning flange 7*f* can obtain the joint area necessary for joint with a predetermined joint strength even when the suspension tower 7 is displaced in the vertical direction and the vehicle width direction.

As a result, the positioning flange 7*f* of the suspension tower 7 is configured such that the fixation position where the positioning flange 7*f* is fixed to the joint flange 30*d* is adjustable in the three axial directions of the vehicle body 2.

When the front side frame body 30 configured as described above is applied, the positioning flange 7*f* can displace the suspension tower 7 in the vertical direction and the vehicle width direction without cutting the extension end portion 7*i*. In addition, the positioning flange 7*f* can be joined to the joint flange 30*d* without reduction in the joint strength.

It is noted that an open cross-section with an H-shape has been formed by the upper wall portion 30*a*, the bottom wall portion 30*b*, and the vertical wall portion 30*c* in the front side frame body 30, but the end portions of the upper wall portion 30*a* and the bottom wall portion 30*b* on the inner side in the vehicle width direction may be coupled to each other form a substantially rectangular closed cross-section.

In addition, for example, the upper wall portion 30*a* constituting the closed cross-section having the substantially rectangular shape may be inclined to the lower inner side in the vehicle width direction to form a closed cross-section. In this case, the inclined upper wall portion 30*a* may be used as the joint flange instead of the joint flange 30*d* of the front side frame body 30.

The disclosure described in the embodiments described above is not limited to these embodiments and various modifications can be made without departing from the concept thereof at the implementation stage. Furthermore, the embodiments described above include disclosures at various stages, and various disclosures can be derived by appropriately combining multiple disclosed features.

In addition, even when some of the features are removed from all the features illustrated in the embodiments described above, if the described problems can be solved and the described effects can be obtained, the structure from which these features have been removed can be derived as the disclosure.

According to the vehicle body front structure of the disclosure, the front side frame and the suspension tower can be shared among multiple types of vehicles in which the mounting position of the suspension device is not the same.

The invention claimed is:

1. A vehicle body front structure for a vehicle, the vehicle-body front structure comprising:

front side frames in a pair, the front side frames being arranged in a vehicle width direction of the vehicle and extending in a vehicle body longitudinal direction of the vehicle; and suspension towers in a pair, the suspension towers supporting upper portions of suspension devices, the suspension towers being disposed outside the front side frames in the vehicle width direction, wherein joint flanges are provided respectively in the front side frames and are inclined while extending to an upper outer side in the vehicle width direction respectively toward the suspension towers, wherein positioning flanges are provided in a lower end portion of the suspension towers respectively, each of the positioning flanges being selectively fixed to a fixation position of two or more different fixation positions set in a corresponding one of the joint flanges, wherein each of the positioning flanges is configured such that the fixation position where each of the positioning flanges is fixed to the corresponding one of the joint flanges is adjustable in three axial directions of a vehicle body of the vehicle, wherein a length of the joint flange in a vehicle body longitudinal direction is longer than a length of the positioning flange in the vehicle body longitudinal direction, wherein the positioning flange extends in a state of being inclined downward and inward in the vehicle width direction, and wherein a length of the positioning flange in an extending direction is set longer than a length of the joint flange in the extending direction.

2. The vehicle body front structure according to claim 1, wherein each of the front side frames comprises a front side frame body and an extension frame joined to a front end of the front side frame body, and wherein the front side frame body is configured such that a length of the extension frame to be joined to the front side frame body is selectable.

3. The vehicle body front structure according to claim 2, wherein the front side frame body and the suspension tower are molded by aluminum die casting.

4. The vehicle body front structure according to claim 1, wherein by the length of the joint flange in the vehicle body longitudinal direction, the positioning flange is joinable to the joint flange at two or more different fixation positions along the vehicle body longitudinal direction without reduction in joint strength.

5. The vehicle body front structure according to claim 1, wherein an area of a contact surface between each joint flange and the corresponding positioning flange is set larger than a joint area required to join the joint flange and the positioning flange at a predetermined joint strength.

6. The vehicle body front structure according to claim 5, wherein a length of each of the positioning flanges in the extending direction of the corresponding one of the joint flanges is set longer than a length of the joint flange in the extending direction, such that each of the positioning flanges is joinable to the corresponding one of the joint flanges without reduction in joint strength when the suspension tower is displaced in the vehicle width direction or in a vehicle body vertical direction.

7. The vehicle body front structure according to claim 1, wherein each of the front side frames comprises a pair of side wall portions facing each other in the vehicle width direction, an upper wall portion coupling upper end portions of the pair of side wall portions, a bottom wall portion coupling lower end portions of the pair of side wall portions, the pair of side wall portions, the upper wall portion, and the bottom wall portion forming a rectangular closed cross-section, and wherein each of the joint flanges extends from a coupling portion between the upper wall portion and an outer one of the pair of side wall portions.

8. The vehicle body front structure according to claim 1, wherein each of the front side frames comprises a pair of side wall portions facing each other in the vehicle width direction, an upper wall portion coupling upper end portions of the pair of side wall portions, and a bottom wall portion coupling lower end portions of the pair of side wall portions, each of the joint flanges extending from a coupling portion between the upper wall portion and an outer one of the pair of side wall portions toward the corresponding suspension tower, and wherein each of the suspension towers comprises a top plate portion and vertical wall portions extending downward from edge portions of the top plate portion, each of the positioning flanges extending from a lower end portion of an inner one of the vertical wall portions so as to be inclined to a lower inner side in the vehicle width direction and configured to make contact with the corresponding one of the joint flanges from above.

9. The vehicle body front structure according to claim 8, wherein a length of each of the joint flanges in the extending direction thereof is set to be substantially the same as a length of the corresponding one of the positioning flanges in the extending direction, such that the positioning flange is joinable to the joint flange without reduction in joint strength when the suspension tower is displaced in the vehicle width direction or in a vehicle body vertical direction without cutting an extending end portion of the corresponding one of the positioning flanges.

10. The vehicle body front structure according to claim 1, wherein each of the suspension towers comprises a top plate portion having a substantially rectangular shape in plan view, and vertical wall portions extending downward from edge portions of the top plate portion, and wherein each of the positioning flanges extends from a lower end portion of an inner one of the vertical wall portions so as to be inclined to a lower inner side in the vehicle width direction, the positioning flange being configured to make contact with the corresponding one of the joint flanges from above.

11. The vehicle body front structure according to claim 10, wherein each of the suspension towers further comprises a suspension mounting hole formed in the top plate portion, the suspension mounting hole comprising a substantially circular standing portion that stands upward from the top plate portion and is configured to receive an upper end portion of a shock absorber of a suspension device from below.

12. The vehicle body front structure according to claim 10, wherein each of the suspension towers further comprises a second positioning flange provided in an outer edge portion of the top plate portion in the vehicle width direction, and wherein the vehicle body front structure further comprises upper side frames disposed outside the suspension towers in the vehicle width direction and extending in the vehicle body longitudinal direction, each of the second positioning flanges being joined to a side wall portion of a corresponding one of the upper side frames.

13. The vehicle body front structure according to claim 12, wherein each of the upper side frames has a substantially L-shaped cross-section comprising a top plate portion disposed at a position facing an engine hood and a side wall portion extending downward from an end portion of the top plate portion on an inner side in the vehicle width direction, and wherein the second positioning flange of each of the suspension towers is joined to the side wall portion of the corresponding one of the upper side frames.

14. The vehicle body front structure according to claim 1, wherein each of the suspension towers is formed by aluminum die casting.

15. The vehicle body front structure according to claim 1, wherein each of the front side frames comprises a front side frame body and a torque box provided at a rear end of the front side frame body, the torque box having a rectangular closed cross-section, and wherein the front side frame body and the torque box are integrally molded by aluminum die casting.

16. The vehicle body front structure according to claim 15, wherein a rear end portion of each of the front side frame bodies is joined to a front end portion of a corresponding side sill and a front end portion of a corresponding floor side frame via the torque box.

17. The vehicle body front structure according to claim 1, wherein each of the front side frames comprises a front side frame body and an extension frame joined to a front end of the front side frame body, the extension frame having a rectangular closed cross-section and being formed by aluminum extrusion molding.

18. The vehicle body front structure according to claim 1, wherein each of the front side frames comprises a front side frame body having an upper wall portion, a bottom wall portion, and a vertical wall portion extending between the upper wall portion and the bottom wall portion at an intermediate position in the vehicle width direction so as to form an open cross-section with an H-shape, and wherein each of the joint flanges extends diagonally to an upper outer side in the vehicle width direction from an intermediate portion of the vertical wall portion in the vehicle body vertical direction to an outer end portion of the upper wall portion in the vehicle width direction.

19. The vehicle body front structure according to claim 1, wherein each of the positioning flanges has an extending end portion that is configured to be cut to change a length of the positioning flange in the extending direction of the corresponding one of the joint flanges, thereby adjusting the fixation position of the suspension tower with respect to the front side frame in the vehicle width direction and a vehicle body vertical direction.

* * * * *